: US 11,265,297 B2
(45) Date of Patent: Mar. 1, 2022

(12) United States Patent
Lewin et al.

(54) SECURELY SHARING CONTEXT BETWEEN WEB FRAMES

(71) Applicant: Microsoft Technology Licensing, LLC, Redmond, WA (US)

(72) Inventors: Guy Lewin, Tel Aviv (IL); Itamar Azulay, Mishmar Ayyalon (IL); Lucy Goldberg, Hertzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 16/502,093

(22) Filed: Jul. 3, 2019

(65) Prior Publication Data
US 2021/0006544 A1 Jan. 7, 2021

(51) Int. Cl.
H04L 29/06 (2006.01)
(52) U.S. Cl.
CPC .......... H04L 63/0281 (2013.01); H04L 63/20 (2013.01)
(58) Field of Classification Search
CPC .............................. H04L 63/0281; H04L 63/20
See application file for complete search history.

(56) References Cited

U.S. PATENT DOCUMENTS

| 2013/0055063 A1* | 2/2013 | Mondal | G06F 9/4552 715/234 |
| 2013/0311863 A1 | 11/2013 | Gutkin et al. | |
| 2018/0205705 A1* | 7/2018 | Kupferschmied | H04L 67/146 |

OTHER PUBLICATIONS

"Web Messaging", retrieved from <<https://en.wikipedia.org/wiki/Web_Messaging>>, Sep. 18, 2017, 4 pages.
"HTML element", retrieved from <<https://en.wikipedia.org/wiki/HTML_element>>, May 29, 2019, 39 pages.
"Framing (World Wide Web)", retrieved from <<https://en.wikipedia.org/wiki/Framing_(World_Wide_Web)>>, Feb. 27, 2019, 5 pages.
"Framekiller", retrieved from <<https://en.wikipedia.org/wiki/Framekiller>>, Mar. 15, 2019, 3 pages.
"Proxy server", retrieved from <<https://en.wikipedia.org/wiki/Proxy_server>>, May 26, 2019, 11 pages.

(Continued)

Primary Examiner — Noura Zoubair
(74) Attorney, Agent, or Firm — Ogilvie Law Firm

(57) ABSTRACT

Sharing context between web frames increases consistent application of security policies, without requiring changes to a document object model. A proxy receives a first request implicating a first web frame and its URL, potentially issues a sub-request and gets a sub-response, and creates a first response to the first request, including a context in frame creation or frame navigation code. Thus, context such as a domain identification is made available for sharing between the first web frame and a second web frame without altering a document object model of a web page of the first web frame, and without imposing a same-origin policy workaround. Sharing the context allows the proxy to ascertain a policy based on the context, so it can apply the policy in reactions to subsequent requests. Context sharing allows window frames to be associated together in the proxy, and informs browser rendering.

20 Claims, 5 Drawing Sheets

(56) References Cited

OTHER PUBLICATIONS

"Document Object Model", retrieved from <<https://en.wikipedia.org/wiki/Document_Object_Model>>, May 11, 2019, 4 pages.
Mark Lieberman, "Foxy Gestures", retrieved from <<https://addons.mozilla.org/en-US/firefox/addon/foxy-gestures/>>, Nov. 3, 2018, 11 pages.
Mark Lieberman, "foxygestures", retrieved from <<https://github.com/marklieberman/foxygestures/blob/master/src/content/mouseEvents.js>>, no later than May 31, 2019, 21 pages.
"Same-origin policy", retrieved from <<https://en.wikipedia.org/wiki/Same-origin_policy>>, May 29, 2019, 6 pages.
"Same-origin policy", retrieved from <<https://developer.mozilla.org/en-US/docs/Web/Security/Same-origin_policy>>, no later than May 31, 2019, 7 pages.
"DOM events", retrieved from <<https://en.wikipedia.org/wiki/DOM_events>>, Jan. 6, 2019, 22 pages.
"Query string", retrieved from <<https://en.wikipedia.org/wiki/Query_string>>, Jun. 10, 2019, 6 pages.
"ECMAScript", retrieved from <<https://en.wikipedia.org/wiki/ECMAScript>>, Jun. 13, 2019, 10 pages.
"Document.domain", retrieved from <<https://developer.mozilla.org/en-US/docs/Web/API/Document/domain>>, Mar. 18, 2019, 5 pages.
"International Search Report and Written Opinion Issued in PCT Application No. PCT/US20/033008", dated Jul. 31, 2020, 8 Pages.

* cited by examiner

SECURELY SHARING CONTEXT BETWEEN WEB FRAMES

BACKGROUND

The World Wide Web includes text documents, images, videos, and other digital resources which are linked to one another by hyperlinks, and which are accessed over the Internet using a software application called a "web browser". The World Wide Web is often referred to simply as the "Web" or "the web". Web browsers are often referred to simply as "browsers", or referred to by their respective product names, e.g., Chrome®, Safari®, Firefox®, Opera®, IE™ or Internet Explorer®, Microsoft Edge®, and so on (marks respectively of Google, LLC; Apple, Inc.; Mozilla Foundation; Opera Software; Microsoft Corporation).

In its requests, a browser identifies the requested information using Uniform Resource Locators (URLs). The URL typically specifies a domain, e.g., "uspto.gov" or "microsoft.com", a file path and filename within the domain, and a communication protocol such as Hypertext Transfer Protocol (HTTP) or Hypertext Transfer Protocol Secure (HTTPS). With the aid of web servers and other infrastructure, the browser retrieves the identified information from the specified storage location on a web server that serves the specified domain, using the specified protocol. Text, images, and videos retrieved by the browser are then displayed on a user device's screen. The user's device may be a smartphone, a tablet, a computer workstation, or a laptop, for example.

Different items of information retrieved by a web browser may be displayed together as a single web page, even though each item has its own respective URL. Sometimes items with different URLs are displayed in different frames of a web page. Frames may be defined using web page languages such as Hypertext Markup Language (HTML). Items displayed in different frames may come from web servers at different domains. Those web servers are not necessarily informed that their respective served contents are being presented together to a user as part of a single web page. Accordingly, there may be inconsistencies or conflicts between the security policies that are meant to govern the respective contents of different frames of a given web page within a browser.

SUMMARY

Sharing context between frames allows the detection and resolution of inconsistencies or conflicts between the security policies that are meant to govern the respective contents of different frames of a given web page within a browser. Some embodiments presented herein use or perform operations that enhance cybersecurity by allowing frames of a web page to share domain identifications or other context (a) without requiring changes to a document object model of the web page, and (b) without requiring the imposition by suffix proxy of a shared top level domain that contravenes the spirit of the same-origin policy.

In some embodiments, a proxy helps securely share context among web frames. The proxy receives from a requestor a first request which implicates a first web frame and a first domain of the first web frame. The proxy issues a first sub-request corresponding to the first request, gets a first sub-response to the first sub-request, and creates a first response to the first request, with the first response including at least a portion of the first sub-response. The proxy adds a context to the first response, including at least an identification of the first domain. The context is added to the first response, and sent to the requestor with the first response. Thus, the context is made available for sharing between the first web frame and a second web frame without altering a document object model of a web page of the first web frame. For example, suppose the proxy subsequently receives from a requestor (the same or another requestor) a second request which implicates a second domain of the second web frame. The second domain is different than the first domain. The second request includes the context in a query string parameter of the second request. This sharing of the context allows the proxy to ascertain a policy based on the context, so it can apply the policy in a reaction to the second request. Qualifiers such as "first", "second", and so on are used herein to indicate respective items, as explained further below, not as ordinals.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
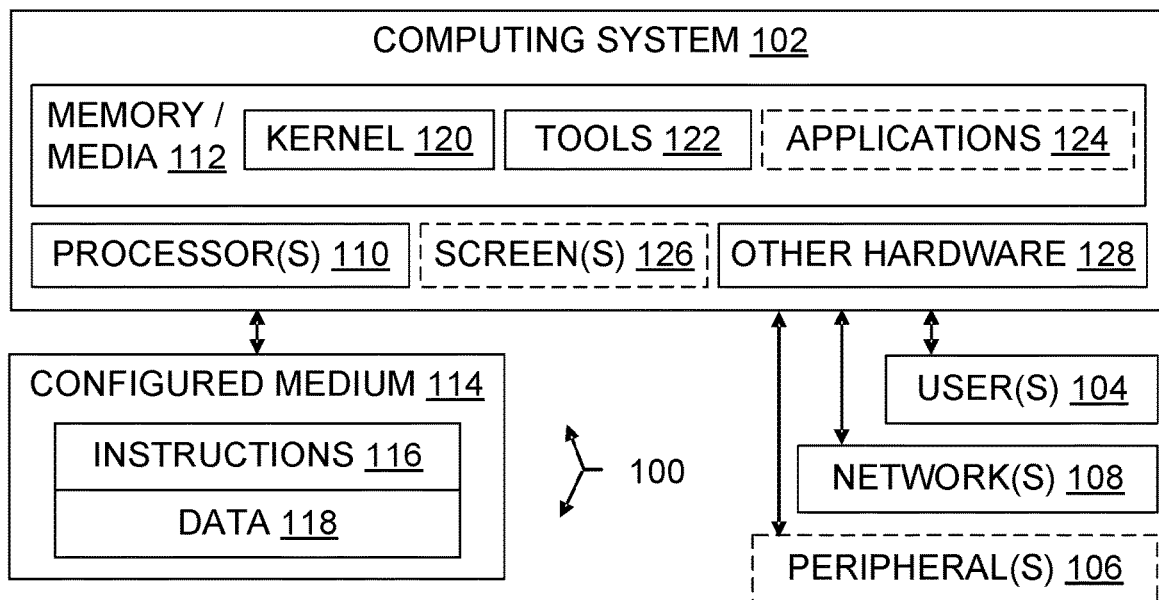
FIG. 1 is a block diagram illustrating computer systems generally and also illustrating configured storage media generally.

Many innovations expand beyond their origins, but understanding an innovation's origins can help one more fully appreciate the innovation. In the present case, some teachings described herein were motivated by technical challenges of applying security policies of a domain of a top frame (a.k.a. "outer frame") to all inner frames. In particular, a challenge was to how to apply security policies consistently within a web page of a SharePoint® website (mark of Microsoft Corporation) without risking content loads from unknown and possibly malicious websites as inner frames are loaded. However, one of skill will recognize that the teachings provided herein have beneficial applicability to many other technical configurations as well.

Web pages displayed to users are often built from multiple frames, in effect containing several different pages in one window. From a user perspective, this window is often perceived as a single web page, and it may be discussed as such herein, with the understanding that one of skill may consider it to be more precisely described as a window containing individual constituent pages which are defined using web frames. The aggregation or agglomeration of content from different domains into respective web frames can be achieved using an <iframe> HTML tag, or a legacy <frame> HTML tag, or Google's recently announced <portal> tag, for example. Proxy servers (both forward and reverse proxies) can modify the content of any or all of these constituent pages, that is, the content of the constituent web frames.

Sometimes it is desirable to share information between frames. For example, Microsoft Cloud App Security™ services and other security solutions may apply different security precautions or constraints depending on which application is associated with a top-level domain of a window. Thus, context may be shared between frames in order to associate the right application across the window, thereby giving a product better accuracy for events and policies configured by a client.

Some embodiments disclosed herein catch frame creations, at all of the places a new frame is created, e.g., in HTML and in JavaScript® and other ECMAScript implementations (mark of Oracle America, Inc.). In addition, some embodiments catch all the inner frame address changes in such places. In all of these cases, private query string parameters are added to requests to a proxy and responses from the proxy, to pass context between the top frame and any other frame in the window. Using this technology, context is passed between all frames without exposing a framed web page to security issues created by other approaches, as discussed herein.

In particular, one alternative approach uses a frame's postMessage( ) function in order to pass messages between frames. This messaging is problematic in some proxied solutions, because postMessage( ) creates new DOM elements or events. Creating new DOM elements or events inside a page that one does not fully control may (and from experience, sometimes does) lead to breaking the web page.

The innovative technology disclosed herein is more secure than using postMessage( ) and doesn't need to involve a frame's renderer parsing any content from frames that are unknown to the designer of the original framed content. Some embodiments herein need not affect the DOM structure or the security configuration of the page, which helps these embodiments avoid breaking any web page. Some embodiments herein are more secure than alternatives because these embodiments avoid parsing any request or response from unknown web pages.

One of skill will acknowledge that many browsers enforce a same-origin policy. Under this policy, a browser allows scripts in a web page A to access content of a web page B only if both web pages have the same origin. The origin of a web page is the web page's URI scheme (e.g., HTTP or HTTPS), host name (e.g., domain name), and port number. A goal of the same-origin policy enforcement is to prevent a malicious script on one web page from accessing sensitive data on another web page. A work-around sometimes used is to append the same domain name to communications to and from different web pages, so they appear to have the same origin even though they actually originated from different domains. Such a work-around downgrades the security of a solution by overriding policies that would otherwise govern access. Some embodiments herein are more secure than alternatives that use this work-around, because these embodiments avoid changing the DOM sharing top domain in order to share top domain with all other frames.

Some embodiments described herein may be viewed by some people in a broader context. For instance, concepts such as address, alteration, proxy, request, response, and sharing may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to share domain identifications between web frames without altering a document object model and without overriding the original domains with a shared domain suffix. Other configured storage media, systems, and processes involving address, alteration, proxy, request, response, or sharing are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular requests, responses, URLs, operating systems, software development environments, programming languages, markup languages, tags, software processes, development tools, identifiers, files, data structures, notations, control flows, pseudocode, naming conventions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications between a proxy and other devices in a computer network, web frame creation, navigation to different domains under the Internet Domain Name System, identification and enforcement of security policies to control access to digital data, and web browsing, which are each activities deeply rooted in computing technology. Some of the technical mechanisms discussed include, e.g., query string parameters in URLs, web frame tags, domain names, markup languages, proxies, and browsers. Some of the technical effects discussed include, e.g., transmission of context between web frames, avoidance of postMessage( ) usage for context sharing, and avoidance of suffixed shared domains to work around enforcement of the same-origin policy. Thus, purely mental processes are clearly excluded. Some embodiments improve the functioning of computing systems by sharing domain identification and other context between frames of a given window, and increasing policy enforcement consistency by allowing a proxy to associate otherwise disjoint requests and enforce a policy across multiple (or all) frames of a window. Other advantages based on the technical characteristics of the teachings will also be apparent to one of skill from the description provided.

Note Regarding Hyperlinks

This disclosure may contain various URIs, hyperlinks, IP addresses, and/or other items which might be considered browser-executable codes. These items are included in the disclosure merely as a courtesy, rather than being included to reference the contents of the web sites or files that they identify as necessary support for the description of embodiments. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01(VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTML: hypertext markup language
HTTP: hypertext transfer protocol
HTTPS: hypertext transfer protocol secure
IaaS or IAAS: infrastructure-as-a-service
ID: identification or identity
IoT: internet of things
IP: internet protocol
LAN: local area network
MITM: man in the middle; refers to a device interposed between other devices in a communication path between those other devices
OS: operating system
PaaS or PAAS: platform-as-a-service
RAM: random access memory
ROM: read only memory
SIEM: security information and event management; also short for "SIEM tool"
UEFI: Unified Extensible Firmware Interface
URI: uniform resource identifier
URL: uniform resource locator
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Proxy operations such as issuing requests and sub-requests, getting responses and sub-responses, creating responses, adding context to a response in a query string parameter, and many other operations discussed, are understood herein as inherently digital. A human mind cannot interface directly with a CPU or other processor, or with RAM or other digital storage, to read and write the necessary data to perform the web frame context sharing steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

Qualifiers such as "first", "second", and so on are used herein to indicate respective items, which may or may not have the same value; they are not used to indicate any particular position in an ordered list of items. When an item is assumed or known to occupy a first-in-the-ordinal-sense position (so far as relevant items are concerned), then the term "initial" will be used as a qualifier. Thus, a "first query string parameter" does not necessarily occupy the initial or lead position in an ordered list of query string parameters. Also, a first query string parameter and a second query string parameter are different items, but they do not necessarily have different values; they may each recite the same text, or their respective texts may differ in some way. Also, even when a "second" action occurs or has relevance at a later time than a "first" action, there may be intervening actions. Thus, although a relevant sequence of actions could include a "first request" followed by a "first response" followed by a "second request" followed by a "second response", with no intervening requests or responses, in another situation a relevant sequence of actions could instead include a "first request" followed by a "first response" followed by an intervening request X followed by a "second request" followed by an intervening response Y followed by a "second response", as just one of many possibilities.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, altering, applying, ascertaining, associating, attaching, blocking, calculating, creating, denying, generating, getting, issuing, listing, loading, modifying, operating, providing, reacting, receiving, reducing, returning, sending, sharing, transferring, using, utilizing (and adds, added, alters, altered, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, simulators, fuzzers, repository access tools, version control tools, optimizers, collaboration tools, software development tools and tool suites, hardware development tools and tool suites, diagnostics, and so on
124 applications, e.g., word processors, web browsers, spreadsheets, games, email tools
126 display screens, also referred to as "displays"
128 computing hardware not otherwise associated with a reference number 106, 108, 110, 112, 114
200 web browser
202 window containing one or more web frames
204 web frame
206 proxy; may also be referred to as "proxy server", "proxy service", or "proxy device"; includes hardware and software; may be implemented using stand-alone appliances, virtual machines, containers, or code in applications or kernels, for example; unless indicated otherwise, "proxy" refers to both forward proxies and reverse proxies
208 web server; may also be referred to as "web service", or "website", includes hardware and software
210 domain; may also be referred to as "domain name"
212 web page
214 content for web page, e.g., HTML, scripts, images, videos, sound files
300 aspects of a proxy or a proxy environment
302 cloud; may also be referred to as "cloud computing environment"
304 virtual machine, e.g., a computing construct which provides hardware virtualization and includes an operating system
306 container, e.g., a computing construct which provides user space virtualization and does not itself include an operating system but is nonetheless reliant upon an operating system to execute
308 log, e.g., syslog file, event file, or other record of events
310 forward proxy; this is a proxy 206 which is typically located close to clients (end user machines). The forward proxy receives client requests for access to a server such as a web server, and then the forward proxy makes corresponding requests to the actual servers. The client knows the identity of the server but does not necessarily know about the forward proxy; the forward proxy is often transparent to the client.
312 reverse proxy; this is a proxy 206 which is typically located close to servers, e.g., web servers. To clients or end users, the reverse proxy appears to be a server. The reverse proxy receives client requests as if the proxy were the server targeted by the requests and then the reverse proxy makes corresponding requests to servers. The client knows the identity of the reverse proxy in the apparent role of server, e.g., web server, but the client does not usually know about the reverse proxy's communications with the actual web server.
314 debugger; a software development tool
316 profiler; a software development tool
318 SIEM tool; a cybersecurity tool
320 HTML; may refer to the markup language itself, to capabilities associated with the markup language, or to code written using the markup language, e.g., to web page source code
322 postmessage routine; may also be referred to using different capitalizations; may also be referred to as "postMessage( )" where the "( )" indicates a routine; although the identifier "postMessage" is widely used, reference numeral 322 and "postMessage" (in any capitalization) also refer to any web messaging or cross-document messaging routine however named that allows web pages (a.k.a. "documents") of different origins (in the same-origin policy sense) to communicate with one another while rendered or rendering in a web browser
324 an elapsed time; the start time and end time at the endpoints of an interval which has the elapsed time as its duration will be clear from surrounding text or drawing(s); the elapsed time may be in microseconds, CPU cycles, system ticks, or another unit of time
400 computing system configured with web frame context sharing functionality; may also be viewed as a particular computing system 102 or a particular computing environment 100
402 requestor
404 document object model (DOM)
406 request, e.g., web page content request
408 response to a request 406
410 web frame context 412 web frame context sharing code; includes software which performs web frame context sharing operations described herein
414 policy, e.g., a security policy which governs some aspect of digital data or computing resource confidentiality, availability, or integrity
416 sub-request; may also be viewed as a continuation or development or successor of a request 406 and as a request 406 in its own right
418 sub-response; may also be viewed as a precursor or fodder or basis of a response 408 and as a response 408 in its own right
420 response content
502 user interface; may include one or more of a command line interface, a graphical user interface (GUI) or an application program interface (API), for example
600 aspects of web frame context
602 uniform resource locator (URL)
604 identification (e.g., domain name) of a domain; may be, e.g., an identification of a governing domain (which may also referred to as a "top domain" or as domain of "outer frame") whose policy should govern an inner frame's web page content
606 query string parameter in URL, e.g., in the hypothetical URL "https://example.com/directory1/page1?context=foobar-dot-com&lang=english" the portion "context=foobar-dot-com" is one query string parameter and the portion "lang=english" is another query string parameter; to overcome a lack of space in a URL, a query string parameter may also be stored in a communication's body, e.g., in a body of a request 406 or a response 408
608 timestamp; time may be measured in microseconds, CPU cycles, system ticks, or another unit of time
610 overall web page or window identifier generated by a proxy
700 aspects of a document object model (DOM)
702 DOM tree
704 DOM tree node
706 DOM event
708 DOM event handler
710 DOM element
800 web frame context sharing flowchart; 800 also refers to web frame context sharing methods illustrated by or consistent with the FIG. 8 flowchart, and to the actions of sharing web frame context (or the actions of facilitating such sharing) using such a method
802 receive a request 406 implicating a web frame, e.g., a navigation request to change a URL associated with the web frame, or a load request to obtain web page content to be displayed in the web frame
804 create a response 408 to a request 406
806 add context 410 to a response 408; although given a separate reference numeral for emphasis, adding context may be integral to creating the response, or adding 806 may be a separate step performed after creating the response
808 sharing of web frame context
810 return a response; as used herein, "return" is interchangeable with "send" in that returning 810 a response to a browser does not require previously receiving that response from the browser
812 receive web frame context in communication, e.g., from browser
814 use web frame context
816 ascertain a policy to be applied, based on a web frame context, e.g., by a lookup using the domain or its hash or other identifier as a key
818 apply a policy governing web page content or access to web page context
820 create a list of web frames that belong to the same window as one another
822 list of web frames that belong to the same window as one another
824 calculate an elapsed time 324
826 reduce a security risk of sharing web frame context, e.g., by avoiding an action that has identifiable risks, such as altering a DOM or imposing a shared top domain
828 provide a list 822, e.g., by displaying it, by saving it in a file, or by creating or transferring a data structure representing it
900 flowchart; 900 also refers to web frame context sharing methods illustrated by or consistent with the FIG. 9 flowchart (which incorporates the steps of FIG. 8)
902 issue (e.g., send) a sub-request
904 get (e.g., receive) a sub-response
906 avoid altering a DOM
908 alter a DOM
910 add an element or an event to a DOM
912 modify an element or an event of a DOM
914 operate as a reverse proxy
916 operate as a forward proxy
918 load web page content, or send web page content for subsequent loading
920 react to a request 406
922 include context 410 in a request or response, or be included in a request or response
924 block web page content from being loaded into a window or a web frame
926 deny at least part of a request 406
928 avoid transferring an entire DOM
930 transfer an entire DOM
932 generate a window identifier 610
934 avoid attaching a suffix to evade the constraints of a same-origin policy
936 attach a suffix to evade the constraints of a same-origin policy
938 suffix containing shared top domain; used to evade the constraints of a same-origin policy
940 enforcement of a same-origin policy; may also be referred to as the constraints of a same-origin policy; numeral 940 may also refer to the same-origin policy itself
942 avoid utilizing a PostMessage routine 322
944 utilize (e.g., invoke execution of, or be altered through execution of) a PostMessage routine 322
946 associate an inner frame to a corresponding outer frame using web frame context 410; also refers to associating web frames with one another as part of the same window or session
948 any step discussed in the present disclosure that has not been assigned some other reference numeral
950 avoid triggering script code in another frame
952 triggering script code
954 script code in a frame
956 control rendering; also refers to rendering
958 use context in client, e.g., in browser or other requestor Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (AS-SPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
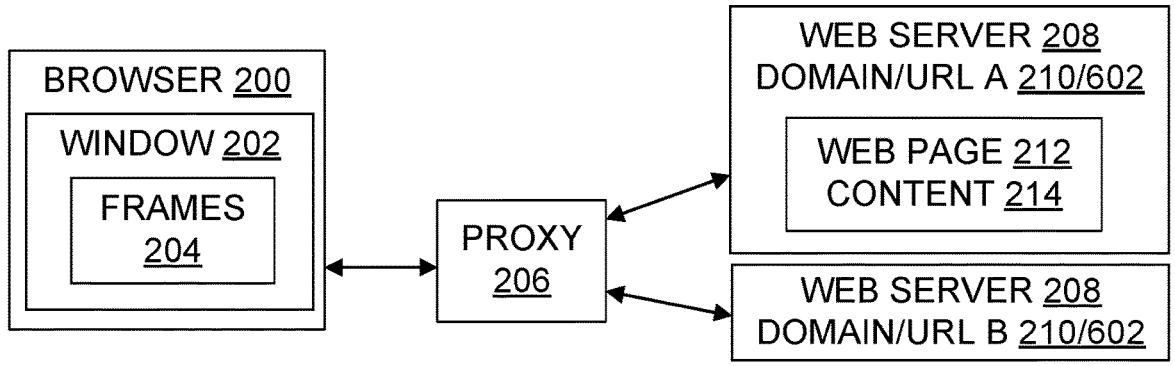
FIG. 2 is a block diagram illustrating an environment which includes a browser, a proxy, and some web servers.

With reference to FIGS. 1 through 7, some embodiments use or provide a functionality-enhanced system 206. The functionality enhancement promotes cybersecurity by facilitating sharing of web frame context while avoiding some conventional risky approaches to sharing context. As shown in the example of FIG. 2, a web browser 200 has a window 202 which a user may perceive as a single web page 212 but which actually contains two or more web frames 204. The browser requests web page content 214 from web servers 208 which serve one or more URLs 602. These URLs may include some or all different domains 210, or all have the same domain 210; an embodiment's ability to associate 946 frames with one another as parts of a given window may be employed even when associated frames have the same domain 210. A proxy 206 is in the communication path between the browser 200 and the web servers 208. The proxy 206 facilitates sharing of context 410, such as URL 602 or URL domain 210 identifications, between the web frames 204. The web frame context sharing facilitated by the proxy 206 supports applications of one domain's policy 414 or one URL's policy 414 to the contents 214 of other domains or other URLs, for example. Although not shown in FIG. 2 or 4, other devices may reside between the browser 200 and the proxy 206, or between the proxy 206 and a web server 208, such as gateways, switches, routers, firewalls, or even other proxies 206.

Figure 3:
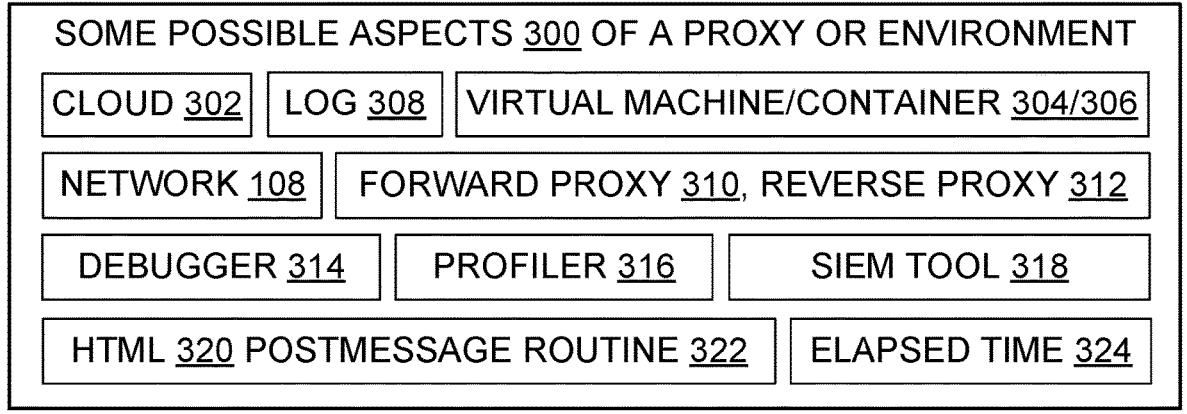
FIG. 3 is a block diagram illustrating some aspects of some proxies and some aspects of some proxy environments.

FIG. 3 shows some additional aspects 300 of the proxy 206 and its environment, which are discussed at various points throughout this disclosure.

Figure 4:
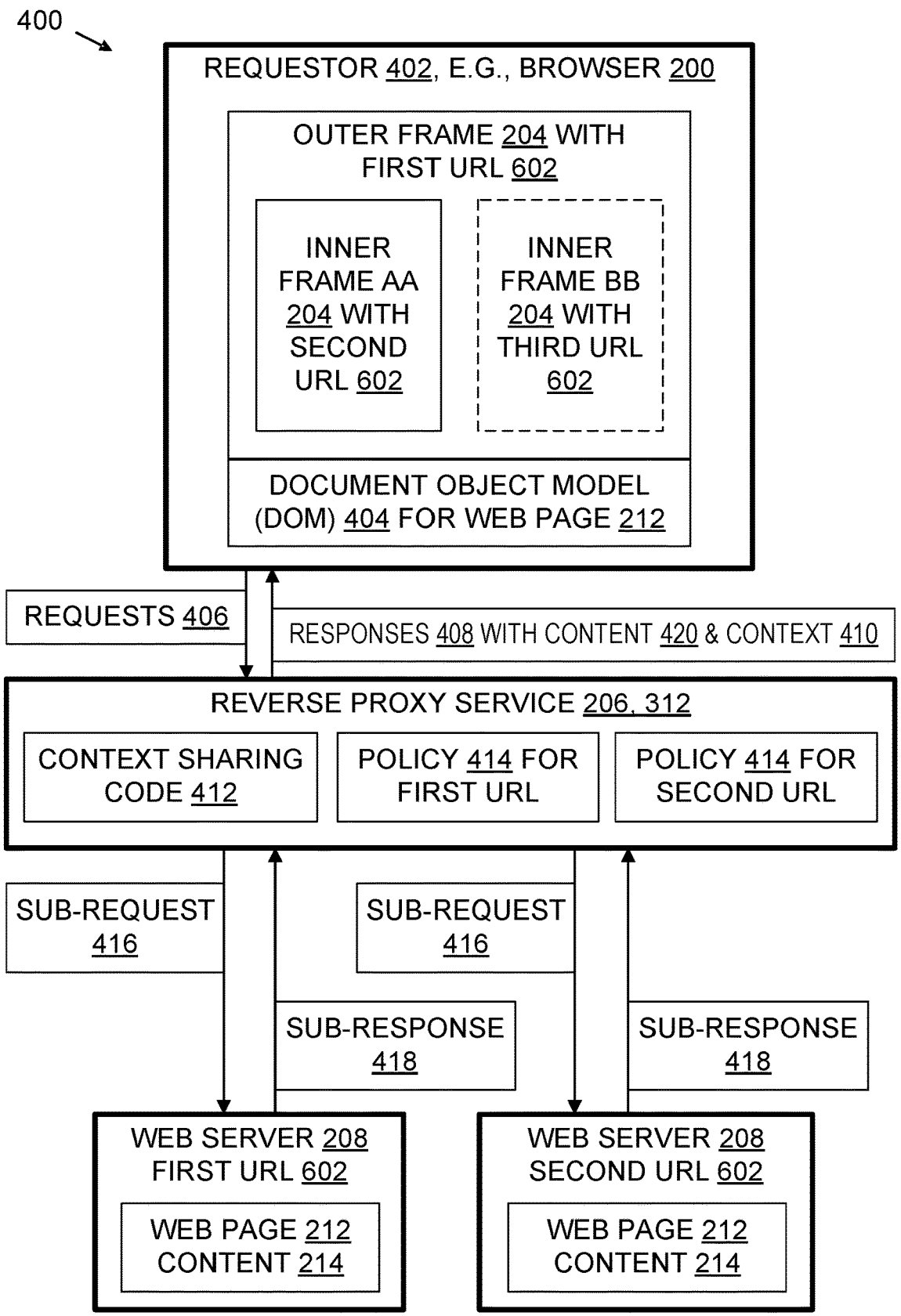
FIG. 4 is a data flow diagram illustrating aspects of a system which is configured with web frame context sharing functionality.

FIG. 4 shows an expanded example which is consistent with FIG. 2. The browser 200 or another requestor 402 has a window with an outer frame 204 and one or more inner frames 204. The frames 204 have respective URLs 602 in this example. One of skill will recognize that frames and URLs or domains may be mapped in various ways, e.g., multiple frames 204 may include content from the same domain, and a given frame may include content from different domains at different points in time.

Figure 7:
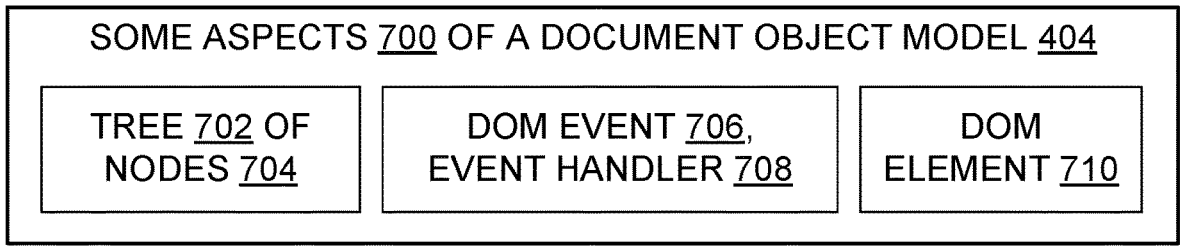
FIG. 7 is a block diagram illustrating some aspects of a document object model (DOM)

In the FIG. 4 example, the browser 200 also includes or accesses one or more document object models 404. FIG. 7 shows some aspects 700 of DOMs 404. A DOM is a data structure which includes a tree 702 of nodes. Nodes 704 include or represent events 706 and page elements 710. Events 706 have associated event handlers 708. Conventional DOMs 404 are suitable for use in environments 400; such environments also include innovative enhancements to web frame context sharing functionality as taught herein.

In the FIG. 4 example, the requestor 402 sends requests 406 toward the web servers 208. However, the proxy 206 intercepts the requests 406. The proxy may react to a request 406 in various ways: the request may effectively be forwarded in the form of a sub-request 416, or the request may be responded to without forwarding by using data cached in the proxy 206, or the request may be denied as a result of applying a policy 414, for example. Sub-requests 416 from the proxy to a web server lead to corresponding sub-responses from the web server to the proxy. Sub-response 418 content may then be put in a response 408 that is sent to the requestor 402 from the proxy. The response 408 includes web frame context 410, which is included in the response by execution of context sharing code 412. Specifically, the context sharing code 412 adds context 410, e.g., as HTML or JavaScript® code in response 408 content 420 or as a value part of a key-value pair that is implemented in a query string parameter 606 in the response 408 (mark of Oracle America, Inc.). Note that some embodiments follow an algorithm whereby the initial response for a given window includes context 410 in frame creation or frame navigation code (e.g., HTML code, JavaScript® code, or other code) in the initial response's content while some or all later responses being associated 946 with that initial request/response include the context 410 in query string parameters 606. Subsequent requests 406 after the initial request 406 may include the context 410 inside their own query string parameters 606. In some embodiments, the query string parameters are made private, using familiar mechanisms.

Figure 5:
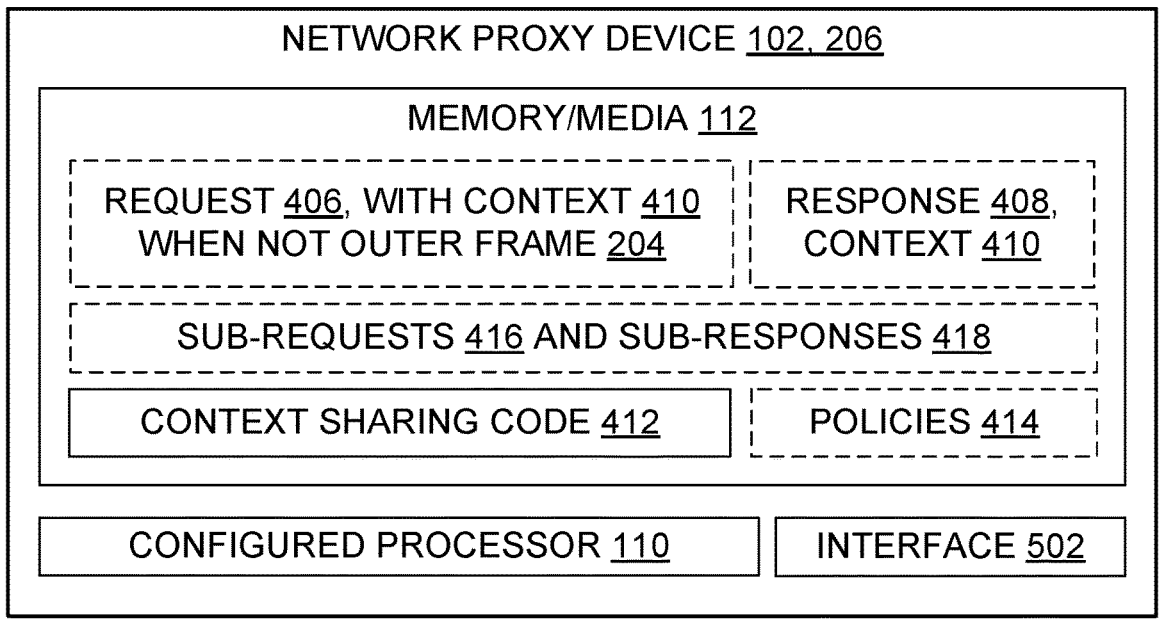
FIG. 5 is a block diagram illustrating some aspects of a proxy device.
Figure 6:
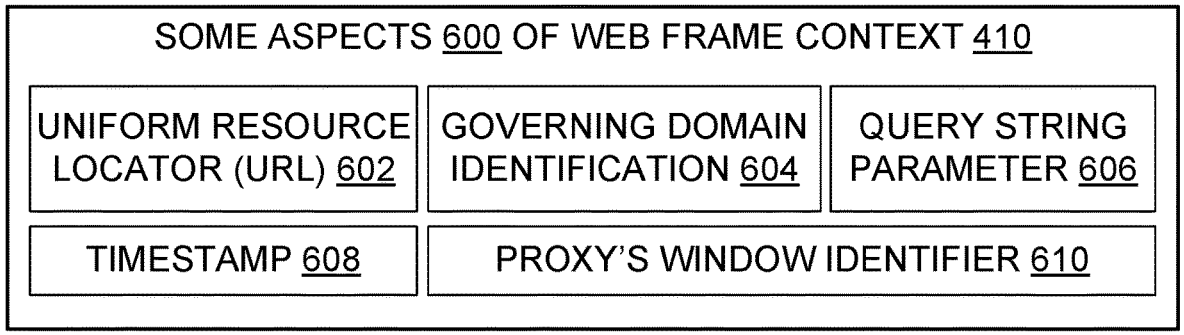
FIG. 6 is a block diagram illustrating some aspects of web frame context.

As to other Figures, FIG. 5 further illustrates an example proxy 206, FIG. 6 shows some aspects 600 of web frame context 410 which are discussed at various points throughout this disclosure, and FIG. 7 was discussed above.

Some embodiments use or provide a proxy device 206 which includes a memory 112 and a processor 110 in operable communication with the memory. The proxy device 206 is configured to securely share context 410 among web frames 204. The processor 110 is configured to perform steps which include (a) receiving from a requestor 402 a first request 406 which implicates a first web frame 204 and may implicate a first URL 602 and a first domain 210 of the first web frame, (b) issuing a first sub-request 416 corresponding to the first request, (c) getting a first sub-response 418 to the first sub-request, (d) creating a first response 408 to the first request, the first response including at least a portion of the first sub-response, (e) adding a context 410 to the first response, the context being added to the first response in a content 420 of the first response, the context including textual information which is configured to associate 946 different web frames with one another by associating 946 web frame requests of a session with one another, e.g., an identification 604 of the first domain or first URL, and (f) returning to the requestor the first response including the added context in the response content. Web frames and domains are "implicated" in a request or a response if they are expressly or implicitly identified in the request or response, or if they are the source or target of the request or response. In this embodiment, the context 410 is made available for sharing between the first web frame and a second web frame, without relying on any of the following to make the context thus available for sharing: an addition or a modification of a document object model event 706, or an addition or a modification of a document object model element 710. In some embodiments, the proxy device creates the first response without issuing a sub-request and getting a sub-response, and thus does not include any sub-response portion in the first response. For example, the first response may indicate an operational error code, or indicate a security-based denial of the first request.

In some embodiments, the proxy device 206 is configured for operation as a reverse proxy. However, teachings provided herein can also be beneficially employed in forward proxy operations.

In some embodiments, the first request 406 includes a browser request to load web page content 214 to the first web frame 204. As is normal practice in patent documents, qualifiers such as "first" and "second" herein do not necessarily imply a strict time ordering but may be used instead to distinguish between instances of the same or similar items.

In some embodiments, the processor 110 is further configured to perform steps which include (g) receiving from the requestor 402 a second request 406 which implicates a second URL 602 or second domain 210 of the second web frame 204, the second URL or domain being different than the first domain, the second request including the context 410 in a query string parameter 606 of the second request, and (h) reacting 920 to the second request based at least in part on the context. In some of these embodiments, the second request includes a request to load 918 web page content 214 to the second web frame, and reacting to the second request includes blocking 924 at least a portion of the requested web page content, thereby preventing the requestor from loading the blocked portion.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

Figure 8:
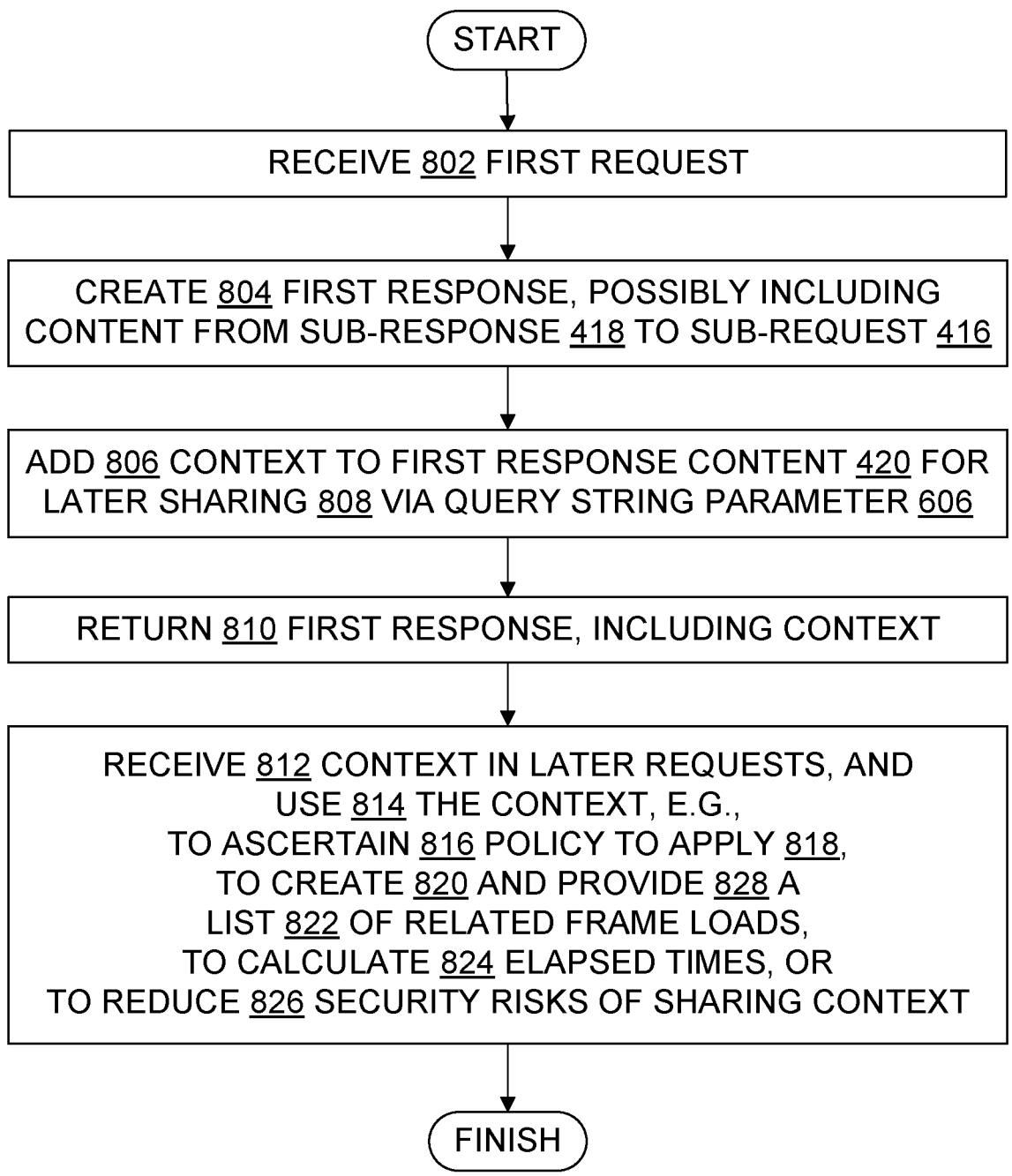
FIG. 8 is a flowchart illustrating steps in some web frame context sharing methods.

FIG. 8 illustrates a method 800 which is an example of methods that may be performed or assisted by an enhanced system 206. The enhanced system receives 802 a request and creates 804 a response. The response may include content from a sub-response, or content from a cache, or the response may include a request denial based on a policy, or the response 408 may be a combination of the foregoing, for example. The method adds 806 the web frame context to the response if the context 410 was not already added during response creation 804, and returns 810 the result to the requestor. Since the requestor will normally propagate the response's query string parameters 606 into later related requests 406 (and thus help transmit the context 410 back to the proxy), the method shown in FIG. 8 also includes receiving 812 the context 410 in one or more later requests. The context 410 can then be used 814, e.g., to ascertain 816 a policy 414 to apply 818, to create 820 or update 820 a list 822 of related frames 204 or frame operations (load, navigate, refresh, etc.), or to calculate 824 elapsed times, such as the approximate time 324 since the first outer frame was loaded. By using query string parameters 606 to share 808 context instead of invoking PostMessage( ) or imposing 936 a shared top domain, the embodiment reduces 826 security risks relative to approaches that use PostMessage( ) or approaches that use a shared top domain suffix 938.

Figure 9:
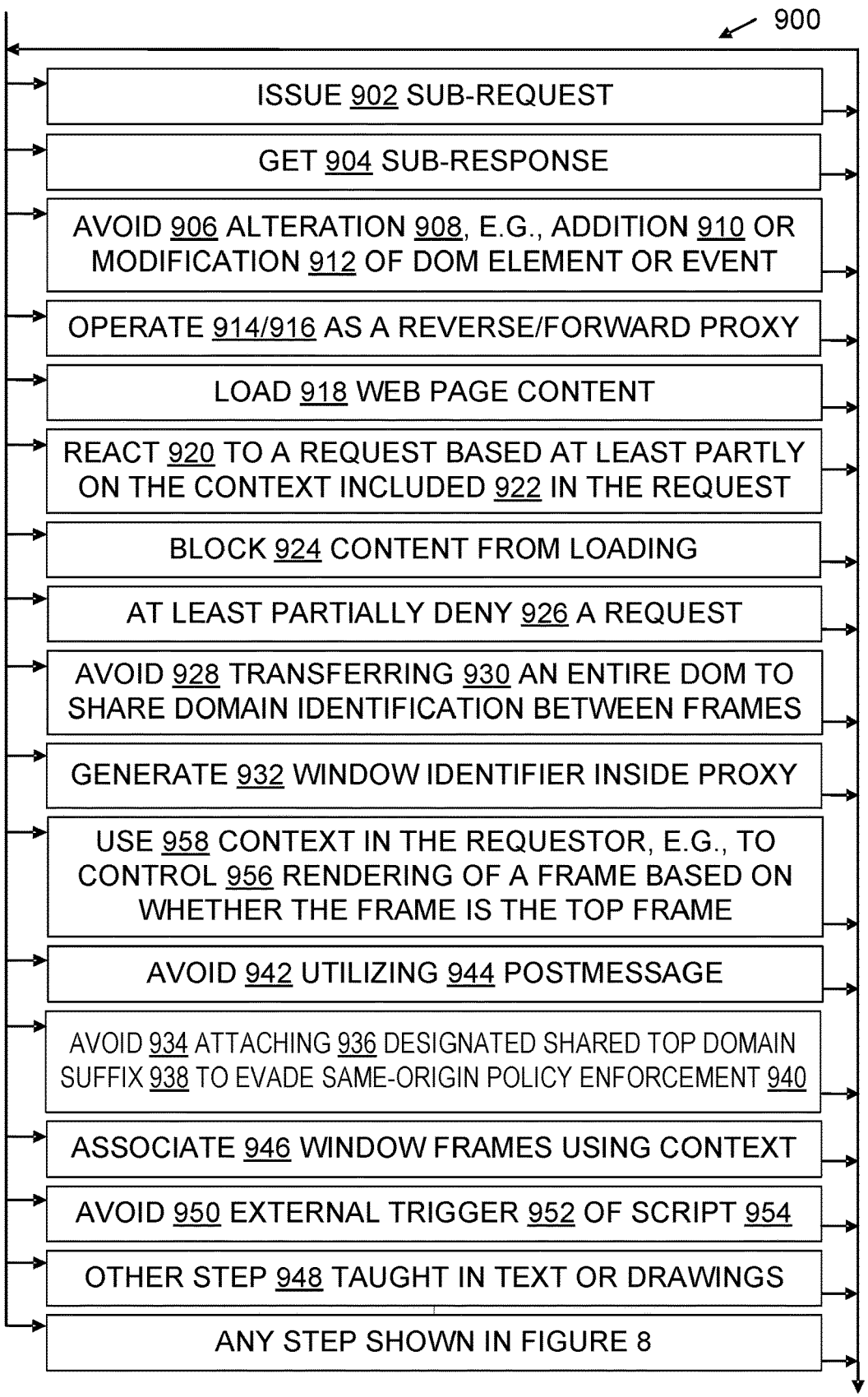
FIG. 9 is a flowchart further illustrating steps in some web frame context sharing methods.

FIG. 9 further illustrates web frame context sharing methods (which may also be referred to as "processes" in the legal sense of that word) that are suitable for use during operation of a system 400, including some refinements, supplements, or contextual actions for steps shown in FIG. 8. Technical processes shown in the Figures or otherwise disclosed will be performed automatically, e.g., by a proxy 206, unless otherwise indicated. Processes may also be performed in part automatically and in part manually to the extent action by a human administrator or other human person is implicated, e.g., in some embodiments a person may specify policy 414 constraints, or may associate a particular policy 414 with a particular URL 602 or domain 210. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 action items or flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method performed by or with a proxy to aid securely sharing context among web frames, the method including the proxy: receiving 802 from a requestor a first request which implicates a first web frame and a first URL of the first web frame; creating 804 a first response to the first request; adding 806 a context to the first response, the context being added to the first response, the context including at least one of the following: at least a portion of an identification of the first URL, or an indication whether the first web frame is a top frame of a window; and returning 810 to the requestor the first response including the added context in the first query string parameter. This method is further characterized in that the context is made available for sharing 808 between the first web frame and a second web frame without altering 908 a document object model of a web page of the first web frame.

Some embodiments, further include the proxy: receiving 802 from a requestor a second request which implicates a second URL of the second web frame, the first web frame having a first URL, the second URL being different than the first URL, the second request including 922 the context in a query string parameter of the second request; ascertaining 816 a policy based on at least the context; and applying 818 the policy in a reaction to the second request. In some cases, applying 818 the policy includes at least partially denying 926 the second request, e.g., by not providing requested content 214. In some cases, applying 818 the policy includes logging the second request, and in some it includes encrypting at least a portion of a second response which responds to the second request. A reaction 920 to a request may also include more than one such action, e.g., log the request and deny it.

In some embodiments, the proxy issues 902 a first sub-request corresponding to the first request, gets 904 a first sub-response to the first sub-request, and includes at least a portion of the first sub-response in the first response.

In some embodiments, the proxy issues 902 a second sub-request corresponding to the second request, gets 904 a second sub-response to the second sub-request, and creates 804 a second response to the second request, with the second response including at least a portion of the second sub-response and the context. Then the proxy returns 810 the second response to the requestor, including the context in the query string parameter. Thus, the embodiment may avoid 934 attaching 936 to the responses a suffix with a shared top domain which has been designated as the origin pursuant to a browser's same-origin policy. Designation as the origin may be performed in some situations by setting a domain property of a document, e.g., by executing code such as "var domainString=document.domain; document.domain=origin-string;" where origin-string is the intended shared top domain. Note that in some implementations the suffix may still be attached, but not be designated as the origin because the domain property has not been set to match the suffix.

In some embodiments, the requestor controls rendering 956 of content 214 to the first web frame, and said controlling rendering is based at least in part on the context 410. For example, a visual style may be applied only to the outer frame, which is identified as the outer frame based on the context. More generally, although many of the examples given in this disclosure involve use of the context 410 in the proxy 206, in some embodiments the context 410 is used 958 in the browser 200 or another requestor 402, e.g., a test program which exercises the browser.

In some embodiments, adding 806 the context to the first response includes adding at least one of the following: a timestamp 608 of the first request, a web page identifier 610 generated by the proxy.

Some embodiments utilize 814 the context while creating 820 an ordered list 822 of a plurality of frame loads which are implicated in responses from the proxy. Such embodiment may provide 828 at least a portion of the ordered list 822 in at least one of the following: a log 308, a display 126, a debugger 314, a profiler 316, or a security information and event management tool 318.

In some embodiments, the method shares 808 the identification of the first domain or other context 410 with the second web frame without transferring 930 any entire document object model between the first frame and the second frame.

In some embodiments, the method makes the context available for sharing 808 between the first web frame and the second web frame without utilizing 944 a postMessage routine 322, or without an external trigger 952 of a script 954 of the second web frame, or without both.

Some embodiments include the proxy: receiving 802 from a requestor a second request which implicates a second URL or domain of the second web frame, the second URL or domain having a different security policy 414 than the first domain, the second request including the context in a query string parameter of the second request; ascertaining 816 a first security policy of the first URL or domain based on at least the context; and applying 818 the first security policy in a reaction to the second request.

Some embodiments include the proxy receiving 802 from a requestor a second request which implicates a second web frame, with the second request including the context, and the proxy associating 946 the first web frame and the second web frame with one another as parts of a single window, based on the context.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as context sharing code 412, responses 408 which include context 410 in a query string parameter 606, requests 406 which include context 410 in a query string parameter 606, and lists 822 of related frames 204 (those in the same window 202), in the form of data 118 and instructions 116, read from a removable storage medium 114 and/or another source such as a network connection, to form a configured storage medium. The configured storage medium 112 is capable of causing a computer system 102 to perform technical process steps for web frame context sharing, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 cause a network proxy device to perform a method which aids securely sharing context among web frames. This method includes: receiving 802 from a requestor a first request which implicates a first web frame; issuing 902 a first sub-request corresponding to the first request; getting 904 a first sub-response to the first sub-request; creating 804 a first response to the first request, the first response including at least a portion of the first sub-response; adding 806 a context to the first response, the context including at least an identification of at least a portion of a first uniform resource locator (URL) of the first web frame; returning 810 to the requestor the first response including the added context in the first query string parameter; receiving 802 from the requestor a second request which implicates a second URL of a second web frame, the second request including 922 the context in a query string parameter of the second request; avoiding 906 altering any document object model in order to share an identification of the first URL with the second web frame; and reacting 920 to the second request based at least in part on the context.

In some embodiments, reacting 920 to the second request includes applying 818 a first policy of the first URL, thereby extending an effective scope of the first policy to include the second request.

Some embodiments include calculating 824 an elapsed time since the first request, first sub-request, first sub-response, or first response. The elapsed time calculation is based at least in part on a timestamp portion of the context.

Some embodiments include receiving 802 from the requestor a third request which implicates a third web frame, the third request including the context in a third query string parameter of the third request; and reacting 920 to the third request based at least in part on the context.

In some embodiments, by virtue using context sharing 808, the method associates 946 each inner frame implicated in any request to the network proxy device to a corresponding outer frame.

ADDITIONAL EXAMPLES AND OBSERVATIONS

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some Context Possibilities. A web page presented to a user 104 may be built out of more than one frame 204. Conventional MITM proxy services handing out such web pages will normally treat every frame within the page separately, since each browser frame load will issue a different request to the proxy service and the conventional proxy lacks a mechanism to accurately connect these frames together based on that traffic. However, transferring context between these frames may be useful. For example, sharing context may allow the proxy service to determine that a frame belongs to an upper page (over all window 202), and to learn information about that upper page 202.

In some scenarios, such context 410 may include the domain 210 of the top frame (which is often seen in the URL 602 that is displayed in the browser's address bar). This access to shared context can be used, for example, to determine by execution of suitable code 412 that an inner utility frame, e.g., a Microsoft Word™ Online frame, is actually contained within a governing website, e.g., a SharePoint® website (marks of Microsoft Corporation). From that, the code 412 can determine that the relevant website for applying security controls and writing into the log 308 by the proxy service 206 is the SharePoint URL, not the Word Online inner frame.

In some scenarios, context 410 may include a timestamp 608 representing the time of loading the top frame 204. This data may be useful to code 412 in computing how long the user has spent on the page 212 without navigating to another one. In embodiments wherein the timestamp of loading the top frame is sent as the context from any inner frame, the proxy server code 412 can determine 820 the order of frame loads and can provide 828 that information 822 to help a developer debug the performance as the page 202 as a whole.

In some scenarios, context 410 may include a request identifier 610. The identifier 610 may be employed as a more granular replacement for a timestamp 608. The proxy server code 412 can generate 932 a random or pseudo-random identifier 610 for the whole page 202, and pass that as a context 410 for inner frames to identify themselves with. This way, the inner frames will send the page identifier 610 to the proxy server 206, and by examining the proxy logs 308 a developer can debug and troubleshoot proxying of a page 202 as a whole.

In some embodiments, the first request 406 contains HTML code, JavaScript® code (mark of Oracle America, Inc.), or other code that will be used by a browser 200 to create new frames 204 or to navigate from a frame 204. Context 410 may then be added 806 to such code. In some cases, only HTML code is present for frame creation or navigation, and the proxy 206 only adds 806 context 410 to that HTML code. In some cases, only JavaScript® code is present for frame creation or navigation, and the proxy 206 only adds 806 context 410 to that JavaScript® code. In some cases, when a system renders a top frame, the top frame has no frame creation or navigation code and no context 410 is added to the top frame.

In some cases with some embodiments, context 410 is sent in a response after the proxy determines that a sub-response 418 has code for frame creation or navigation, and the response will include the sub-response code with the added 806 context 410.

Some embodiments avoid altering the DOM by creating new frames to achieve context sharing. More generally, DOM alteration to achieve context sharing is presumed to be avoided unless stated otherwise.

In some embodiments, the response content 420 with the context 410 may be located, e.g., in an HTML body or head, or elsewhere in a response 408.

As another example, proxy context sharing code 412 may parse HTML code to locate a frame creation code tag, such as a tag of the form "<iframe src=https:// . . . />". In this example, the <iframe> tag will generate a frame, and src specifies the URL the browser will try to load to the frame. The context 410 text may be added to that src value as a query string parameter. One of skill will understand that this is merely one example, and that teachings herein apply more broadly to other codes and other options for navigation or generation of frames, e.g., anchor.target and others.

An Outer Frame-Inner Frame Example. As another example illustrating operation and technical benefits of some embodiments, consider a scenario in which a user opens a Microsoft Office 365® Word™ Online word processing frame inside a frame that is associated with Microsoft OneDrive® storage services. To promote security through consistent application of security policies, the inner word processing frame should inherit or otherwise be governed by the outer frame's security policies 414.

In particular, assume that an admin 104 using a conventional MITM proxy has configured a "block file download" policy 414 on the OneDrive® site 210. One of the users in the organization is browsing to the OneDrive® site, and even though the browser's address bar URL says "onedrive.com" the page seen by the user is built out of multiple frames 204 with various URLs. Assume one of these frames is controlled by a Word Online™ document editor, which is on a different domain 210, namely, "office.com". Assume the user attempts to save the word processor document from within this Word Online™ frame. The MITM proxy server gets the file download request, and sees that the domain is "office.com". Since this is a conventional proxy and the "office.com" domain evidently has nothing to do with "onedrive.com" this conventional proxy server has no way to connect this request to a OneDrive® security policy, even though from the user's point of view the user was in the OneDrive® site and the security controls detailed in the OneDrive® security policy should be enforced.

In addition, a security risk exists because posting and receiving messages may well trigger the run of JavaScript® code or other script code 954 on other frames (mark of Oracle America, Inc.). Even though the code was meant to be run by remote messages, this might be an opportunity for exploit, since the script code can be triggered 952 externally instead of being triggered only within the frame that contains the script code.

However, if the top frame URL 602 had been shared into all the inner frames using the web frame context sharing functionality taught herein, then a suitably enhanced proxy service 206 would have gotten the context from the inner frame (Word Online™) indicating that its parent is a OneDrive® frame. Then proxy code 412 would have been able to connect the frames, recognize 816 that the OneDrive® frame's policy should govern the Word Online™ frame, and block 924 the file download.

In addition, only the necessary information (context 410) would have been passed into or out of the frames, which avoids 950 triggering frame script code that would otherwise being triggered by sending or receiving the context by posting or getting messages. The context 410 is a part of the URL. So the security risk noted above, of an external page triggering 952 script execution, is avoided.

This example scenario may be further understood by considering an instance of the FIG. 4 environment 400 in which an Outer Frame 204 (also known as a "top frame") is the OneDrive® frame, an Inner Frame 204 AA is the Word Online™ frame, one of the web servers 208 serves a first domain "onedrive.com" and the other web server 208 serves a second domain "office.com". Then a flow for a request 406 going through the reverse proxy service 312 and maintaining the context 410 between frames 204 may proceed as follows:

1. Client 200 loads OneDrive® content 214 from the reverse proxy 312.
2. The reverse proxy 312 issues a sub-request 416 to OneDrive® server 208.
3. The OneDrive® server sends a sub-response 418 to the reverse proxy.
4. The reverse proxy adds context 410 to <a>, <frame>, <iframe>, and any JavaScript® code relevant for frame load and navigation.
5. The reverse proxy returns the modified (context-enhanced) OneDrive® response to the client 200.
6. The browser 200 finds an inner frame load of Word Online™ content within the OneDrive® frame.
7. The client 200 sends a load request for Word Online™ content with the context 410 in the query string 606.
8. The reverse proxy uses the context 410 to apply OneDrive® domain-related policies 414 to the Word Online™ request.
9. The reverse proxy issues a sub-request to the Word Online™ server.
10. The Word Online™ server sends a sub-response to the reverse proxy.

As this flow continues, policies related to the OneDrive® domain are applied to the Word Online™ response, e.g., a policy for download detection. The reverse proxy adds context 410 at all relevant places, to keep passing the context 410 down to inner frames. The reverse proxy returns the modified Word Online™ response to the client. Steps are repeated as needed, recursively or iteratively or both, for every inner frame load.

Some PostMessage( ) Observations. Some embodiments avoid 942 using a frame's postMessage( ) function in order to pass messages between frames. Invoking postMessage( ) functionality is problematic in a proxy because creating new DOM elements inside a page one does not control may breaking a web page. Using teaching provided herein permits a solution that is more secure and that need not parse any content from frames unknown to a frame that would have been a postMessage( ) target or recipient.

The functionality of postMessage( ) may be convenient for website creators. But MITM proxies benefit from increased security if they do not assist or allow postMessage( ) calls that create events 706 or DOM elements 710 in a website when the consequences are unclear or undesirable or both. Posting a message between frames 204 will trigger any event listener 708 listening to these events along the way. This includes browser 200 extensions that might break from getting an unexpected event in an unexpected format, as well as other web frames that weren't expecting this type of event. For example, consider a plugin that adds mouse gestures into a browser by inserting frames into a page and sending and listening to messages on them. Implementing context sharing via postMessage( ) may break plugins like this, but passing 808 information 410 via the URL does not. Using postMessage( ) is best limited to situations in which all frames involved and their respective developers are fully informed in advance of the message sender and all the message receivers. Embodiments presented herein need not affect 908 the DOM 404 by adding an element or creating an event, and therefore have minimal impact on the original website.

Embodiments herein may be used on their own, or as an additional security control. Many web application security products such as firewalls and unified threat management (UTM) appliances focus on HTTP or HTTPS traffic for detecting threats, but do not have the contextual information 410 discussed herein. Thus, some embodiments of the present teachings add a new layer of security and detect threats that bypass such security products, by monitoring page-building and navigational processes at a proxy server.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to computing systems 102 in a cloud 302 or elsewhere, and thereby enhance cybersecurity through a combination of (a) sharing web frame context to facilitate consistent application of security policies among web frames while (b) avoiding specific risky approaches to such sharing, e.g., by imposing shared top domains or by using PostMessage( ). In some embodiments, functionality enhancements support sharing 808 web frame context 410 between web frames 204, which increases the consistency of applications 818 of security policies 414 without requiring changes to a document object model 404 or the imposition 936 of a suffixed 938 shared top level domain. A proxy 206 receives 802 a first request 406 implicating a first web frame 204 and its domain 210. The proxy 206 issues 902 a sub-request 416, gets 904 a sub-response 418, and creates 804 a first response 408 to the first request. The proxy 206 includes 922, 806 a context 410 in a query string parameter 606 of the first response 408. Thus, web frame context 410 such as a domain identification 604 is made available for sharing 808 between the first web frame 204 and a second web frame 204 without 906 altering 908 a document object model 404 of a web page 212 of the first web frame 204, and without 934 imposing 936 by suffix 938 a shared top level domain as a same-origin policy 940 workaround, and without 942 utilizing 944 a PostMessage routine 322 to effectuate the context sharing 808. Sharing 808 the context 410 thus allows the proxy 206 to ascertain 816 a policy 414 that is based on the context 410 (e.g., a policy 414 that is associated with a domain or URL which is identified in the context 410), so that the proxy 206 can apply 818 the policy 414 in reactions 920 to subsequent requests 406.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the proxy server 206 may process during program execution. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A proxy device which is configured to securely share context among web frames having different respective security policies, the proxy device comprising:
   a memory;
   a processor in operable communication with the memory, the processor configured to perform steps which include (a) receiving from a requestor a first request which implicates a first web frame of a given web page or a given window, (b) creating a first response to the first request, (c) adding a context to the first response, the context being added to the first response, the context including textual information which is configured to associate different web frames of the given web page or the given window with one another by associating web frame requests with one another, at least two of the different web frames having different respective security policies, (d) returning to the requestor the first response including the added context, and (e) based on at least the context, enforcing a single security policy on the different web frames instead of enforcing different respective security policies on the different web frames, the enforced single security policy being one of: a first security policy of the first web frame, or a second security policy of a second web frame; and
   whereby the context is made available for sharing between the first web frame and the second web frame, thereby facilitating consistent security policy enforcement, without relying on any of the following to make the context thus available for sharing: an addition or a modification of a document object model event, or an addition or a modification of a document object model element.

2. The proxy device of claim 1, wherein the proxy device is configured for operation as a reverse proxy.

3. The proxy device of claim 1, wherein the first request comprises a browser request to load web page content to the first web frame.

4. The proxy device of claim 1, wherein the processor is further configured to perform steps which include (e) receiving from the requestor a second request which implicates the second web frame, the first web frame having a first uniform resource locator (URL), the second web frame having a second URL, the second URL being different than the first URL, the second request including the context in a query string parameter of the second request, and (f) reacting to the second request based at least in part on the context.

5. The proxy device of claim 4, wherein the second request comprises a request to load web page content to the second web frame, and wherein reacting to the second request comprises blocking at least a portion of the web page content from loading.

6. A method performed with a proxy to aid securely sharing context among web frames having different respective security policies, the method comprising the proxy:
   receiving from a requestor a first request which implicates a first web frame of a given web page or a given window and a first URL of the first web frame, the first web frame having a first security policy;
   creating a first response to the first request;
   adding a context to the first response, the context being added to the first response including at least one of the following: an identification of at least a portion of the first URL, or an indication whether the first web frame is a top frame of a window;
   returning to the requestor the first response including the added context; and
   enforcing a single security policy on the first web frame and on a second web frame which has a second security policy that is different from the first security policy, the enforced single security policy being one of: the first security policy or the second security policy, the enforcing based on at least the added context;
   whereby the context is made available for sharing between the first web frame and the second web frame without altering a document object model of a web page of the first web frame, thereby facilitating consistent security policy enforcement.

7. The method of claim 6, wherein enforcing the single security policy includes governing an inner frame by a security policy of an outer frame, the inner frame being one of the first web frame and the second web frame, and the outer frame being the other of the first web frame and the second web frame.

8. The method of claim 6, wherein enforcing the single security policy comprises at least one of the following: at least partially denying the first request or a second request, logging the first request or a second request, or encrypting at least a portion of a response which responds to the first request or a second request.

9. The method of claim 6, further comprising the proxy:
   issuing a first sub-request corresponding to the first request;
   getting a first sub-response to the first sub-request; and
   including at least a portion of the first sub-response in the first response.

10. The method of claim 9, wherein the method further comprises the requestor controlling rendering of content to the first web frame, said controlling rendering based at least in part on the context.

11. The method of claim 6, wherein adding the context to the first response further comprises adding at least one of the following: a timestamp of the first request, a web page identifier generated by the proxy.

12. The method of claim 6, further comprising utilizing the context while creating an ordered list of a plurality of frame loads which are implicated in responses from the proxy, and providing at least a portion of the ordered list in at least one of the following: a log, a display, a debugger, a profiler, or a security information and event management tool.

13. The method of claim 6, wherein the method shares the identification of at least a portion of the first URL with the second web frame without transferring any entire document object model between the first frame and the second frame.

14. The method of claim 6, wherein the method makes the context available for sharing between the first web frame and the second web frame without utilizing a postMessage routine, or without an external trigger of a script of the second web frame, or without both.

15. The method of claim 6, further comprising the proxy:
  receiving from a requestor a second request which implicates the second web frame, the second request including the context in a query string parameter of the second request; and
  associating the first web frame and the second web frame with one another as parts of a single window, based on the context.

16. A computer-readable storage medium configured with data and instructions which upon execution by a processor cause a network proxy device to perform a method which aids securely sharing context among web frames having different respective security policies, the method comprising:
  receiving from a requestor a first request which implicates a first web frame of a given web page or a given window, the first web frame having a first security policy;
  issuing a first sub-request corresponding to the first request;
  getting a first sub-response to the first sub-request;
  creating a first response to the first request, the first response including at least a portion of the first sub-response;
  adding a context to the first response, the context being added to the first response including at least an identification of at least a portion of a first uniform resource locator (URL) of the first web frame;
  returning to the requestor the first response including the added context;
  receiving from the requestor a second request which implicates a second URL of a second web frame, the second request including the context in a query string parameter of the second request;
  avoiding altering any document object model in order to share an identification of the first URL with the second web frame;
  reacting to the second request based at least in part on the context; and
  enforcing a single security policy on the first web frame and on a second web frame which has a second security policy that is different from the first security policy, the enforced single security policy being one of: the first security policy or the second security policy, the enforcing based on at least the added context, thereby facilitating consistent security policy enforcement.

17. The storage medium of claim 16, wherein reacting to the second request comprises applying a first policy of the first URL, thereby extending an effective scope of the first policy to include the second request.

18. The storage medium of claim 16, wherein the method further comprises calculating an elapsed time since the first request, first sub-request, first sub-response, or first response, wherein the elapsed time is based at least in part on a timestamp portion of the context.

19. The storage medium of claim 16, wherein the method further comprises:
  receiving from the requestor a third request which implicates a third web frame, the third request including the context in a third query string parameter of the third request; and
  reacting to the third request based at least in part on the context.

20. The storage medium of claim 16, wherein through the use of context sharing the method associates each inner frame implicated in any request to the network proxy device to a corresponding outer frame.

* * * * *